United States Patent [19]

Yaguinuma

[11] 4,027,550
[45] June 7, 1977

[54] RATCHET CLAW
[75] Inventor: Jusuke Yaguinuma, Tokyo, Japan
[73] Assignee: Copal Company Limited, Tokyo, Japan
[22] Filed: June 2, 1976
[21] Appl. No.: 692,238
[30] Foreign Application Priority Data
  June 5, 1975  Japan .......... 50-75300[U]
[52] U.S. Cl. .................. 74/577 S; 188/82.77
[51] Int. Cl.² ........................ F16D 41/12
[58] Field of Search ........... 74/577 S; 188/82.77; 192/46

[56] References Cited
UNITED STATES PATENTS

| 284,491 | 9/1883 | Sackett | 74/577 S X |
| 1,386,400 | 8/1921 | Gettle et al. | 74/577 S |

Primary Examiner—Allan D. Herrmann

[57] ABSTRACT

Ratchet claw adapted to cooperate with ratchet teeth formed on an annular portion of a rotatable member supported by a shaft on a stationary member for rotation relative thereto so as to prevent the rotation of the rotatable member in one direction. The ratchet claw is pivotally supported at its proximal end while the free ratchet claw portion is adapted to engage with one of the ratchet teeth. The ratchet claw is provided with a resilient ratchet biasing arm extending from a portion adjacent to the proximal end toward the free ratchet claw portion with a distance held therebetween. The biasing arm is so arranged that the annular portion of the rotatable member is resiliently clamped between the ratchet claw portion and the biasing arm so that the radial force urging the ratchet claw portion against the ratchet teeth and the radial force urging the biasing force against the annular portion are cancelled each other thereby preventing any radial force from being applied to the shaft to prevent frictional wear between the rotatable member and the shaft or between the shaft and the bearing of the shaft.

2 Claims, 6 Drawing Figures

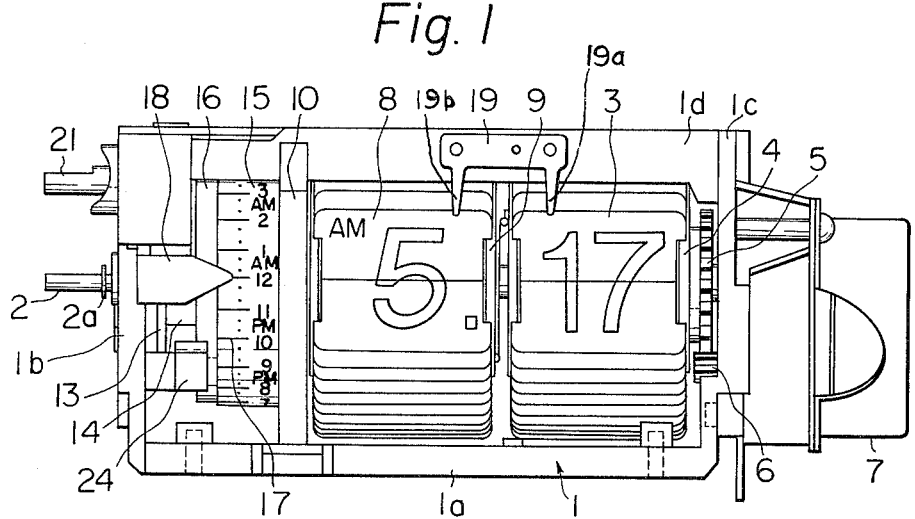
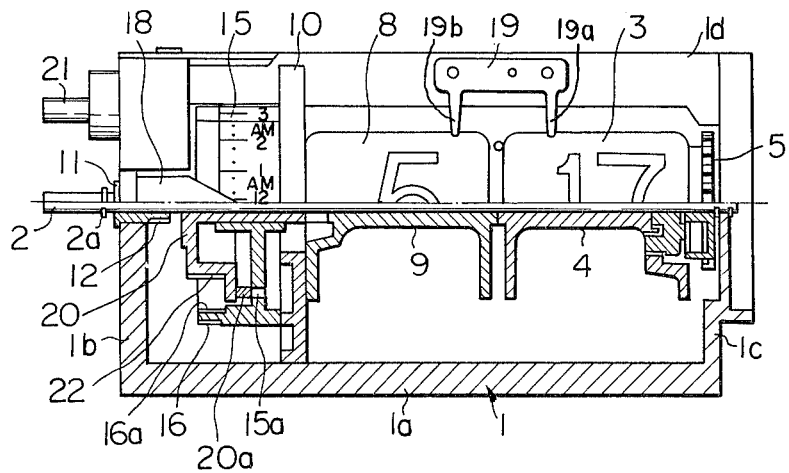
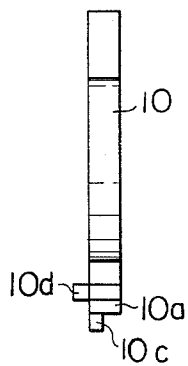
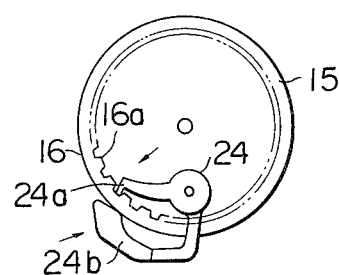
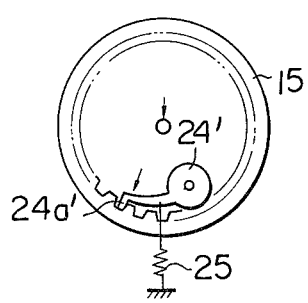

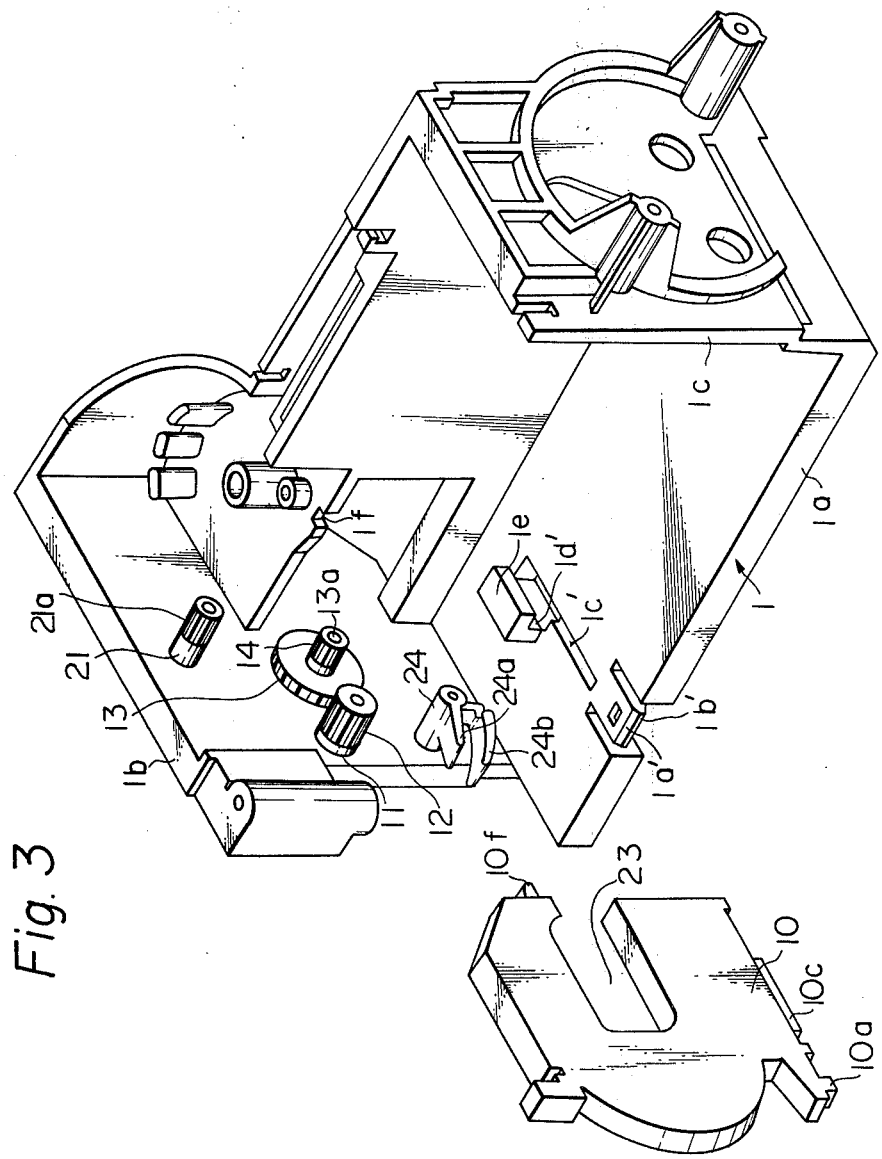

RATCHET CLAW

BACKGROUND OF THE INVENTION

The present invention relates to a ratchet claw for use with ratchet teeth formed on a rotatable member so as to prevent the same from rotating in one direction, and more particularly, to a ratchet teeth of the type described above adapted to be used in a digital clock.

In a digital clock of the prior art, a ratchet claw is provided so as to cooperate with ratchet teeth formed on the periphery of a timer setting drum so as to arrest the same at the set position and prevent the rotation thereof in one direction. In order to insure positive and resilient engagement of the ratchet claw with one of the ratchet teeth, a spring is provided one end of which is secured to the ratchet claw while the other end is secured to a stationary portion of the frame of the digital clock. Therefore, an external radial force is applied by the spring to the shaft of the timer setting drum so that the frictional wear is enhanced and excessive play is generated between the shaft and the bearing thereof or between the timer setting drum and the stationary shaft rotatably supporting the same thereby deteriorating the proper function of the digital clock. Such a tendency is further enhanced recently as the ratchet teeth are formed from a plastic material so as to reduce the manufacturing cost.

The present invention aims at avoiding the above described disadvantage of the prior art ratchet mechanism.

SUMMARY OF THE INVENTION

An object of the present invention is to provide a novel and useful ratchet claw for use with ratchet teeth formed on a rotatable member which is simple in construction and which positively prevents frictional wear of the relatively rotatable supporting portion of the rotatable member.

The other object is to provide a ratchet claw of the type described above which is particularly suitable for use in a digital clock.

The above objects are achieved in accordance with the present invention by the provision of a ratchet claw for use in a device such as a digital clock adapted to be resiliently urged against ratchet teeth formed on an annular portion of a rotatable member such as a timer setting drum of said digital clock supported by a shaft on a frame member of said digital clock for rotation relative thereto, wherein the ratchet claw is pivotally supported on a frame member of the digital clock at its proximal end while its free distal claw portion is adapted to be engaged with the ratchet teeth and the ratchet claw is formed with a resilient ratchet biasing arm extending from a portion of the ratchet claw adjacent to the proximal end toward the free distal claw portion with a distance held therebetween, the ratchet biasing arm being so arranged relative to the free distal claw portion that the annular portion of the rotatable member is resiliently clamped between the free distal claw portion and the ratchet biasing arm so as to cancel each other the biasing forces of the claw portion and the biasing arm applied to the annular portion of the rotatable member thereby positively preventing any radial force from being applied to the shaft by the engagement of the ratchet claw with the rotatable member.

In accordance with a feature of the present invention, the ratchet claw is formed of a resilient plastic material integrally molded together with the ratchet biasing arm.

BRIEF DESCRIPTION OF THE DRAWINGS

FIG. 1 is a front view showing a digital clock incorporating the frame constructed in accordance with the present invention;

FIG. 2 is a front view similar to FIG. 1 with the lower half portion thereof being shown as a sectional view and with the driving motor being removed;

FIG. 3 is an exploded perspective view showing the frame member and the partition plate of the present invention;

FIG. 4 is an end view showing the partition plate;

FIG. 5 is a schematic side view showing the engagement of the ratchet claw with the ratchet teeth in accordance with the present invention; and FIG. 6 is a view similar to FIG. 5 but showing the ratchet claw of the prior art.

DETAILED DESCRIPTION OF THE PREFERRED EMBODIMENT

Referring now to FIG. 1, a digital clock is shown as a device incorporating the ratchet claw of the present invention and it comprises a frame member 1 having a base plate 1a and two opposite side end plates 1b, 1c integrally formed with the base plate 1a which are preferably molded from a plastic material. A driving shaft 2 is rotatably journaled by the side end plates 1b, 1c and a minute drum 4 having a plurality of minute flaps 3 pivotally supported along the periphery of the drum 4 is secured to the shaft 2 so as to be rotated therewith at a predetermined speed through a one-way clutch (not shown) by a reduction gear 5 which meshes with a pinion 6 of a driving motor 7 mounted on the outer surface of the side end plate 1c so as to be driven thereby. The respective minute flap 3 is successively released from a stopper arm 19a of a stopper member 19 secured to a stay 1d spanning between the side end plates 1b, 1c as the drum 4 rotates so that the minute of the time is switchingly indicated by the minute flaps 3.

An hour drum 9 having a plurality of hour flaps 8 pivotally supported along the periphery of the hour drum 9 is rotatably mounted on the driving shaft 2 adjacent to the minute drum 4 and a timer setting drum 15 is arranged on the driving shaft 2 with a partition plate 10 which is to be described later in detail being interposed between the hour drum 9 and the timer setting drum 15. As shown in FIG. 2, the timer setting drum 15 is rotatably supported on an inner collar of a clutch plate 20 which is rotatably and axially shiftably supported on the driving shaft 2. The clutch plate 20 has an outer cylindrical portion having a flange radially extending therefrom and is urged by a spring (not shown) toward the right in FIG. 2 so that the timer setting drum 15 is also urged against the partition plate 10 so as to be held in contact therewith. The spring may be made a resilient actuating member of a switch (not shown) which resiliently urges the clutch plate 20 toward the right and senses the axial position thereof so as to actuate the switch depending upon the axial position of the clutch plate 20.

The timer setting drum 15 has a timer setting scale 17 on the periphery thereof which cooperates with an index 18 mounted on the side end plate 1b so that the setting of the timer at a desired time is effected by the rotation of the timer setting drum 15. To this end, the timer setting drum 15 is formed with a gear 16 at its outer periphery which meshes with a pinion 21a (FIG. 3) integrally formed with a manually operable adjusting shaft 21 thereby permitting the timer setting drum 15 to be set at a desired time by manipulating the adjusting shaft 21. In order to releasably maintain the timer setting drum 15 in the set position thereof, ratchet teeth 16a are formed on the inner periphery of the timer setting drum 15 and one of the ratchet teeth 16a engages with a ratchet claw portion 24a of a ratchet claw 24 (FIG. 3) pivotally supported at its proximal end on the side end plate 1b. In order to maintain the ratchet claw portion 24a in resilient engagement with one of the ratchet teeth 16a of the timer setting drum 15, the ratchet claw 24 is provided with a resilient ratchet biasing arm 24b integrally formed therewith which resiliently urges the outer periphery of the timer setting drum 15 radially inwardly thereof so that the ratchet claw portion 24a in turn resiliently urges the ratchet teeth 16a radially outwardly thereof by the reaction force of the biasing arm 24b. This is the characteristic feature of the present invention as described later in detail.

The end of the driving shaft 2 opposite to that adjacent to the motor 7 is rotatably supported by a hole formed in the side end plate 1b through a sleeve 11 detachably and rotatably fitted in the hole. The sleeve 11 has a D-shaped hole slidably fitted with a D-shaped cross-sectional portion of the driving shaft 2 so as to be rotated therewith but detachable therefrom. A stopper ring 2a fitted on the driving shaft 2 prevents the sleeve 11 from being detached from the shaft 2.

A pinion 12 is formed on the sleeve 11 as shown in FIG. 3, and the pinion 12 meshes with a gear 13 rotatably supported on the side end plate 1b by a shaft 13a, and a pinion 14 integral with the gear 13 meshes with a gear 22 formed on the cylindrical portion of the clutch plate 20 (FIG. 2) so that the clutch plate 20 is rotated at a predetermined reduced speed by the rotation of the driving shaft 2. The clutch plate 20 is coupled with the hour drum 9 through a coupling (not shown) so that the hour drum 9 is also rotated together with the clutch plate 20 by the driving shaft 2.

The respective hour flap 8 is successively released from the stopper arm 19b formed on the stopper member 19 as the hour drum 9 rotates so as to indicate the hour of the time in timed relation with the actuation of the minute flaps 3 indicating the minute of the time. To this end, a synchronizing switching coupling means (not shown) is arranged between the minute flaps 3 and the hour flaps 8 so that the respective hour flap 8 is switched in synchronized relation with the switching of the last one of the series of the minute flaps 3 so as to exactly indicate the time in terms of the hour and the minute.

A timer setting cam 20a (FIG. 2) is provided on the clutch plate 20 extending from the side facing against the timer setting drum 15 toward thereto, and a mating arcuate recess 15a having a predetermined length is formed in the timer setting drum 15, so that the cam 20a engages with the recess 15a when the set time as set by the adjustment of the timer setting drum 15 is reached by the rotation of the clutch plate 20 relative to the timer setting drum 15, and the clutch plate 20 is shifted to the right by the action of the resilient actuating member of the switch so as to actuate the same for activating alarm or radio. A selecting mechanism is provided in the switch in the well known manner so that continuing operation of radio or shut-off alarm or the commencement of operation of radio or alarm at the set time by the timer can be selectively effected.

As described above, the frame is constituted by only two parts, i.e., the frame member 1 and the partition plate 10, thereby reducing the number of parts forming the frame is reduced to the minimum so that the production cost is lowered and assembling is extremely simplified while a high accuracy in operation is maintained by the simple construction of the frame.

As described previously, the frame member 1 comprises the base plate 1a, the opposite two side end plates 1b, 1c and a rear plate integrally molded by a suitable plastic material, and the partition plate 10 is made of a molded plastic material.

In order to detachably secure the partition plate 10 in accurate position to the frame member 1, the partition plate 10 is provided with an arresting lug 10a, a lower guide ridge or elongated lug 10c, is side guide ridge or side lug 10d (FIG. 4) and a positioning lug 10f integrally formed on the partition plate 10, and a recess 23 is formed in the intermediate portion of the partition plate 10 for receiving therein the driving shaft 2 and other elements of the digital clock.

The frame member 1 is formed with a resilient projection 1b' having an arresting hole 1a' for arrestingly engage with the lug 10a when the partition plate 10 is mounted in position in the frame member 1, a guide slot 1c' for receiving the lug 10c so as to properly position the partition plate 10 axially of the driving shaft 2, an inverted L-shaped projection 1e having a groove 1d' for receiving the side lug 10c so as to prevent the upward movement of the partition plate 10 to properly position the same in the vertical direction, and a recess 1f for receiving the lug 10f to prevent lateral movement of the partition plate 10, thereby insuring the proper positioning of the partition plate 10 relative to the frame member 1 once the partition plate 10 is mounted in the frame member 1.

As described previously, the characteristic feature of the present invention lies in the very construction of the ratchet claw having the resilient biasing arm 24a permitting the radial force applied by the ratchet claw portion 24a of the ratchet claw 24 against the ratchet teeth 16a to be cancelled with the opposite radial reaction force applied by the biasing arm 24b of the ratchet claw 24 against the outer periphery of the timer setting drum 15 so as to prevent any radial force from being applied to the supporting portion thereof thereby positively preventing the frictional wear of the relatively rotatable portions while the accurate operation is insured. This is clearly illustrated in FIG. 5.

To the contrary, in the prior art ratchet mechanism shown in FIG. 6, the ratchet claw 24' is biased by a setting 25 having one end attached to the ratchet claw 24' and the other end secured to a stationary portion of the device so as to resiliently urge the ratchet claw portion 24a' against the ratchet teeth so that a radial force is necessarily applied to the relatively rotatable supporting portion of the timer setting drum 15 thereby increasing the frictional wear thereof to deteriorate the function of the digital clock and shorten the life thereof.

I claim:
1. Construction of a ratchet claw adapted to be resiliently urged against ratchet teeth formed on an annular portion of a rotatable member supported by a shaft on a stationary member for rotation relative thereto, the improvement wherein said ratchet claw is pivotally supported on a stationary member at its proximal end while its free distal claw portion is adapted to be engaged with said ratchet teeth and said ratchet claw is formed with a resilient ratchet biasing arm extending from a portion of said ratchet claw adjacent to said proximal end toward said free distal claw portion with a distance held therebetween, said ratchet biasing arm being so arranged relative to said free distal claw portion that said annular portion of said rotatable member is resiliently clamped between said free distal claw portion and said ratchet biasing arm so as to cancel each other the biasing forces of said claw portion and said biasing arm applied to said annular portion of said rotatable member thereby positively preventing any radial force from being applied to said shaft by the engagement of said ratchet claw with said rotatable member.

2. Construction according to claim 1, wherein said ratchet claw is formed of a resilient plastic material integrally molded together with said ratchet biasing arm.

* * * * *